US009280731B2

(12) United States Patent
Moritani

(10) Patent No.: US 9,280,731 B2
(45) Date of Patent: Mar. 8, 2016

(54) IMAGE FORMING SYSTEM, IMAGE FORMING APPARATUS, AND STORAGE MEDIUM HAVING PRINTING CONTROL PROGRAM STORED THEREON

(71) Applicant: KYOCERA Document Solutions Inc., Osaka-shi, Osaka (JP)

(72) Inventor: Yuri Moritani, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/295,260

(22) Filed: Jun. 3, 2014

(65) Prior Publication Data

US 2014/0368870 A1 Dec. 18, 2014

(30) Foreign Application Priority Data

Jun. 14, 2013 (JP) ................................. 2013-126174

(51) Int. Cl.
*G06F 3/12* (2006.01)
*G06K 15/02* (2006.01)
*G06K 15/00* (2006.01)
*G03G 15/00* (2006.01)
*G06K 1/00* (2006.01)

(52) U.S. Cl.
CPC ............ *G06K 15/1806* (2013.01); *G03G 15/50* (2013.01); *G06K 15/002* (2013.01)

(58) Field of Classification Search
CPC ... G06F 3/1222; G06F 3/1238; G06F 3/1292; H04N 1/00307; H04N 1/00222; H04N 2201/006; H04N 2201/0053; H04N 2201/0055

USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

| 2006/0238794 | A1 | 10/2006 | Hada | |
|---|---|---|---|---|
| 2007/0019226 | A1* | 1/2007 | Matsuura et al. | 358/1.14 |
| 2009/0067000 | A1 | 3/2009 | Takiyama | |
| 2014/0023383 | A1* | 1/2014 | Kogusuri | 399/8 |

FOREIGN PATENT DOCUMENTS

| JP | 2006301964 A | 11/2006 |
|---|---|---|
| JP | 2009070102 A | 4/2009 |
| JP | 2010262639 A | 11/2010 |
| JP | 2011186745 A * | 9/2011 |

* cited by examiner

*Primary Examiner* — Thierry L Pham
(74) *Attorney, Agent, or Firm* — Alleman Hall McCoy Russell & Tuttle LLP

(57) ABSTRACT

An image forming system according to one aspect of the present disclosure includes a user registration portion, a user detection portion, and a printing control portion. The user registration portion is configured to register a user so as to associate the user with a print setting. The user detection portion is configured to detect that the user registered by the user registration portion has entered a specific area. The printing control portion is configured to cause an image forming apparatus to print a specific document with the print setting registered by the user registration portion so as to be associated with the user, when entry of the user into the area is detected by the user detection portion.

12 Claims, 9 Drawing Sheets

FIG. 4

34e EXPECTED PARTICIPANT LIST

| EXPECTED PARTICIPANT NAME | PRINT SETTING | | | | | E-MAIL | E-MAIL ADDRESS | ... |
|---|---|---|---|---|---|---|---|---|
| | PAPER | DOUBLE-SIDED | AGGREGATION (2 in 1) | COLOR | CHARACTER | | | |
| ICHIRO SATO | ○ | × | × | ○ | STANDARD | ○ | ABC1@xyz.com | ... |
| JIRO SUZUKI | ○ | ○ | ○ | × | SMALL | × | --- | ... |
| SABURO TAKAHASHI | × | --- | --- | --- | --- | ○ | ABC2@xyz.com | ... |
| ... | ... | ... | ... | ... | ... | ... | ... | |

IMAGE FORMING SYSTEM, IMAGE FORMING APPARATUS, AND STORAGE MEDIUM HAVING PRINTING CONTROL PROGRAM STORED THEREON

INCORPORATION BY REFERENCE

This application is based upon and claims the benefit of priority from the corresponding Japanese Patent Application No. 2013-126174 filed on Jun. 14, 2013, the entire contents of which are incorporated herein by reference.

BACKGROUND

The present disclosure relates to an image forming system, an image forming apparatus, and a storage medium having a printing control program stored thereon, which print a specific document when a user enters a specific area.

Conventionally, an image forming system has been known which prints a specific document when a user enters a specific area.

However, in the conventional image forming system, the same printed objects are provided to all users. Thus, for example, depending on the eyesight or color vision characteristic of the user, an appropriate printed object cannot be provided to the user.

SUMMARY

An image forming system according to one aspect of the present disclosure includes a user registration portion, a user detection portion, and a printing control portion. The user registration portion is configured to register a user so as to associate the user with a print setting. The user detection portion is configured to detect that the user registered by the user registration portion has entered a specific area. The printing control portion is configured to cause an image forming apparatus to print a specific document with the print setting registered by the user registration portion so as to be associated with the user, when entry of the user into the area is detected by the user detection portion.

An image forming apparatus according to another aspect of the present disclosure includes a printing device, a user registration portion, a user detection portion, and a printing control portion. The user registration portion is configured to register a user so as to associate the user with a print setting. The user detection portion is configured to detect that the user registered by the user registration portion has entered a specific area. The printing control portion is configured to cause the printing device to print a specific document with the print setting registered by the user registration portion so as to be associated with the user, when entry of the user into the area is detected by the user detection portion.

A storage medium according to still another aspect of the present disclosure is a non-transitory computer-readable storage medium having stored a printing control program thereon. The printing control program causes a computer to function as: a user registration portion configured to register a user so as to associate the user with a print setting; a user detection portion configured to detect that the user registered by the user registration portion has entered a specific area; and a printing control portion configured to cause an image forming apparatus to print a specific document with the print setting registered by the user registration portion so as to be associated with the user, when entry of the user into the area is detected by the user detection portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows an example of an expected participant list in FIG. 3.

DETAILED DESCRIPTION

Hereinafter, an embodiment of the present disclosure will be described with reference to the drawings.

First, the configuration of an image forming system 10 according to the present embodiment will be described.

Figure 1:
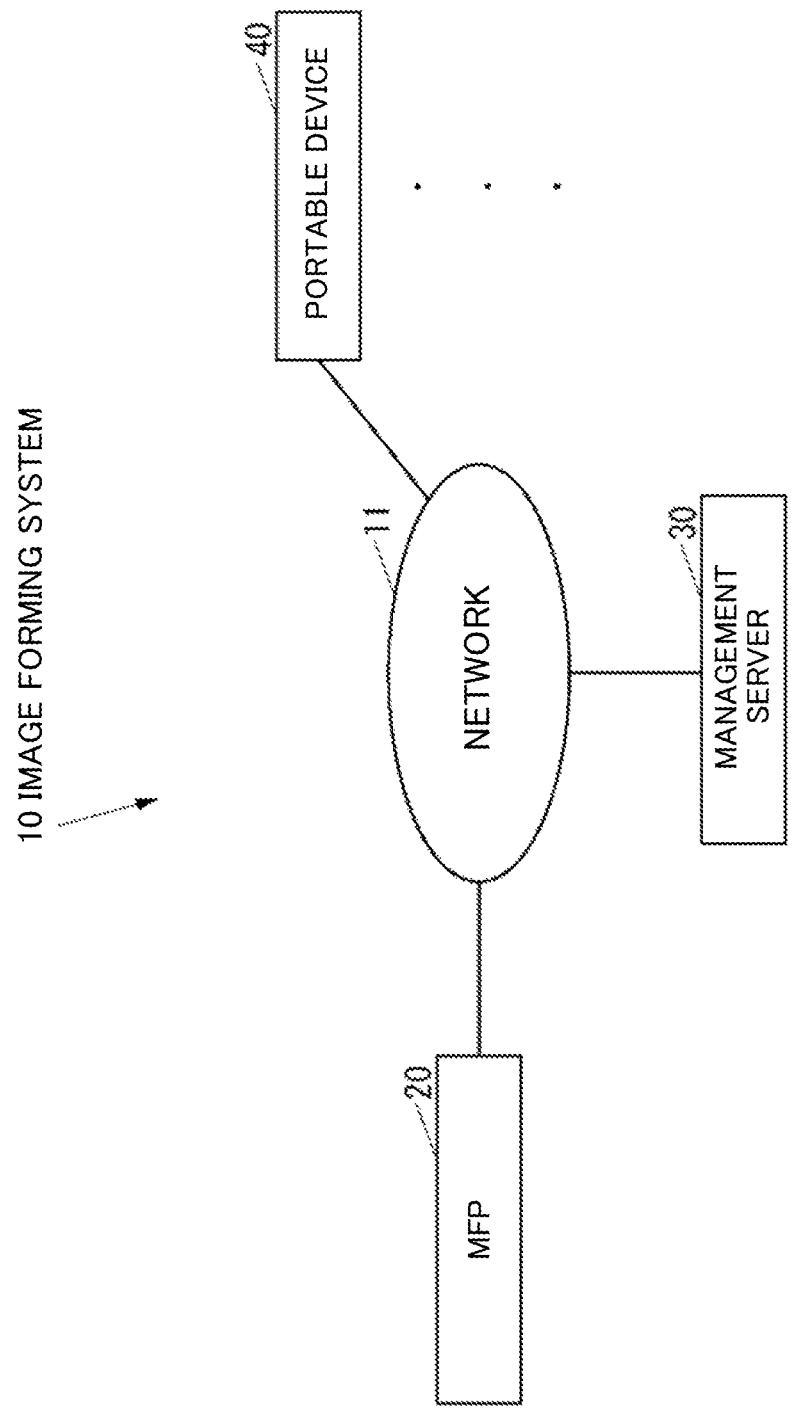
FIG. 1 shows the configuration of an image forming system according to an embodiment of the present disclosure.

FIG. 1 shows the configuration of the image forming system 10 according to the present embodiment.

As shown in FIG. 1, the image forming system 10 includes an MFP (Multifunction Peripheral) 20 as an image forming apparatus, a management server 30 that manages the MFP 20, and a plurality of portable devices including a portable device 40. The MFP 20, the management server 30, and the plurality of portable devices are connected to each other via a network 11 such as a LAN (Local Area Network), the Internet, or the like in a communicable manner. The MFP 20 is installed in a venue for a meeting or near the venue. Each of the plurality of portable devices is carried by each user.

Figure 2:
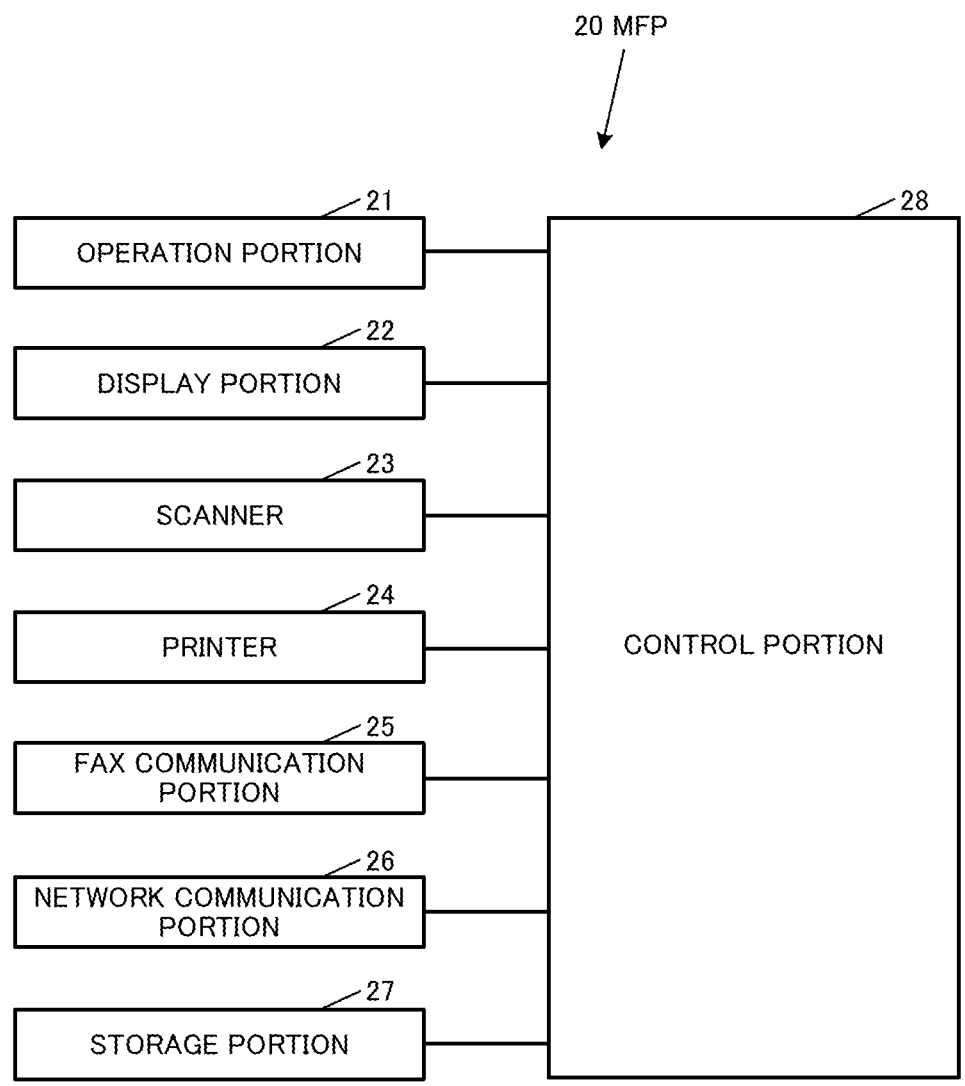
FIG. 2 shows the configuration of an MFP in FIG. 1.

FIG. 2 shows the configuration of the MFP 20.

As shown in FIG. 2, the MFP 20 includes an operation portion 21, a display portion 22, a scanner 23, a printer 24, a fax communication portion 25, a network communication portion 26, a storage portion 27, and a control portion 28. The operation portion 21 is an input device such as a button or the like to which various operations are inputted. The display portion 22 is a device such as an LCD (Liquid Crystal Display) or the like that displays various information. The scanner 23 is a device that reads an image from a document. The printer 24 is a device that executes printing on a recording medium such as a paper sheet. The fax communication portion 25 is a device that performs fax communication with an external facsimile apparatus, which is not shown, via a communication line such as a public telephone line. The network communication portion 26 is a device that performs communication with an external apparatus via the network 11 (see FIG. 1). The storage portion 27 is a non-volatile memory such as an EEPROM (Electrically Erasable Programmable Read Only Memory), an HDD (Hard Disk Drive), or the like that has stored various data thereon. The control portion 28 is a processor that controls the entirety of the MFP 20.

The operation portion 21 may include an input device that forms a touch panel together with the display portion 22.

The control portion 28 includes, for example, a CPU (Central Processing Unit), a ROM (Read Only Memory) having stored thereon a program and various data, and a RAM (Random Access Memory) used as a working area for the CPU. The CPU executes the program stored on the ROM or the storage portion 27.

Figure 3:
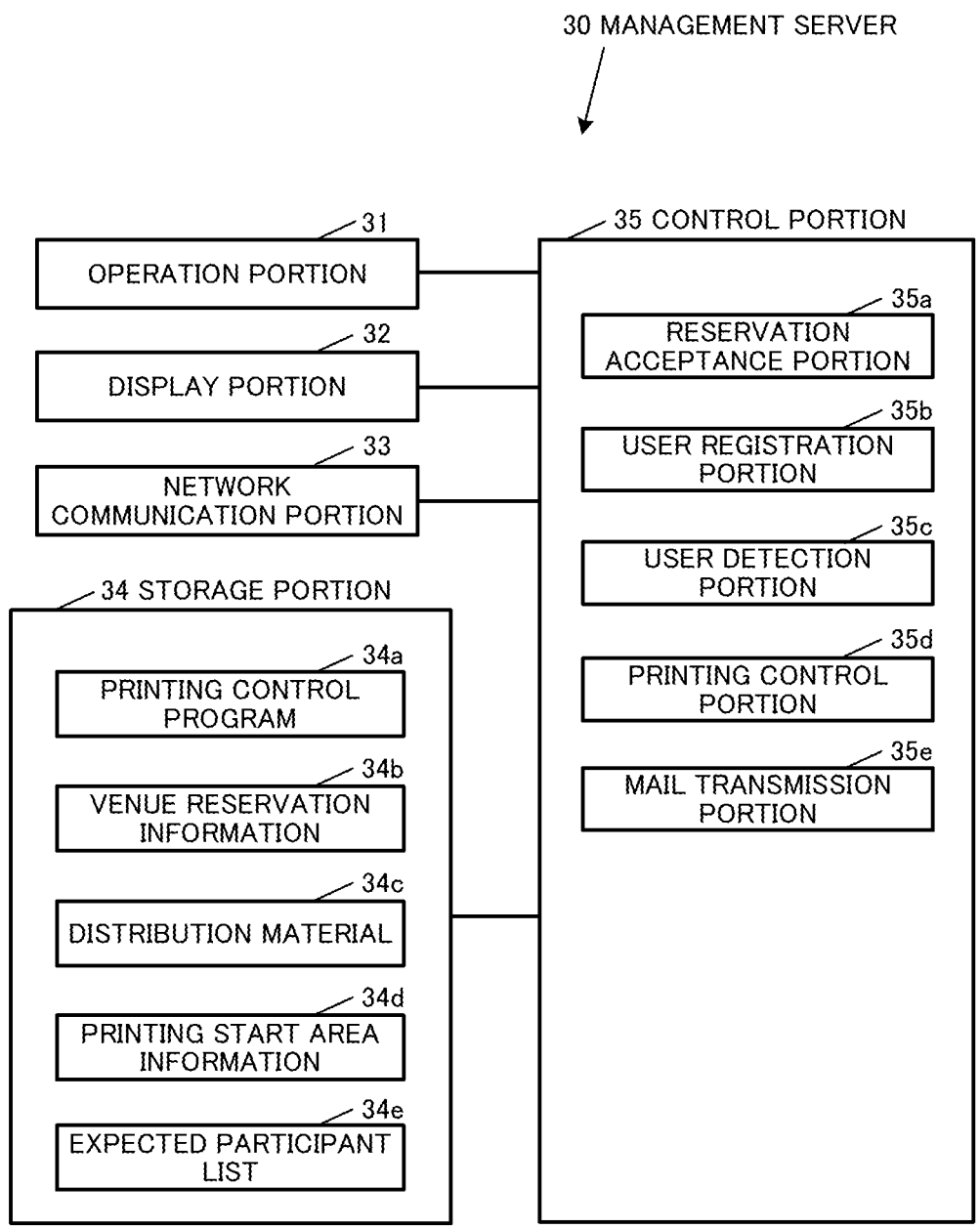
FIG. 3 shows the configuration of a management server in FIG. 1.

FIG. 3 shows the configuration of the management server 30.

As shown in FIG. 3, the management server 30 includes an operation portion 31, a display portion 32, a network communication portion 33, a storage portion 34, and a control portion 35. The operation portion 31 is an input device such as a mouse, a keyboard, or the like to which various operations are inputted. The display portion 32 is a device such as an LCD or the like that displays various information. The network communication portion 33 is a device that performs communication with an external apparatus via the network 11 (see FIG. 1). The storage portion 34 is a non-volatile memory such as an HDD or the like that has stored thereon a program and various data. The control portion 35 is a processor that controls the entirety of the management server 30. The management server 30 is composed of a computer such as a PC (Personal Computer) or the like.

The storage portion 34 has stored thereon a printing control program 34a for controlling printing by the MFP 20. The printing control program 34a may be installed onto the management server 30 at the stage of manufacture of the management server 30. The printing control program 34a may be additionally installed onto the management server 30 from a storage medium such as a CD (Compact Disk), a DVD (Digital Versatile Disk), or the like. The printing control program 34a may be additionally installed onto the management server 30 via the network 11.

The storage portion 34 stores venue reservation information 34b representing a reservation status of the venue for the meeting. Here, the reservation status of the venue includes, for example, a date and time on which there is a reservation of the venue, and the title of a meeting that is scheduled to be held on the date and time.

The storage portion 34 stores a distribution material 34c that is to be distributed to participants of the meeting. The distribution material 34c constitutes a specific document according to the present disclosure.

The storage portion 34 stores printing start area information 34d representing a printing start area in which printing of the distribution material 34c is started.

The storage portion 34 stores an expected participant list 34e representing a list of expected participants of the meeting.

FIG. 4 shows an example of the expected participant list 34e.

The expected participant list 34e shown in FIG. 4 includes an "expected participant name" column, a "paper" column, a "print setting" column, an "e-mail" column, and an "e-mail address" column. The "expected participant name" column indicates an expected participant name. The "paper" column indicates whether to receive the distribution material 34c as paper. The "print setting" column indicates a print setting for the distribution material 34c when the distribution material 34c is received as paper. The "e-mail" column indicates whether to receive the distribution material 34c via e-mail. The "e-mail address" column indicates an e-mail address at which the distribution material 34c is received via e-mail. The "print setting" column includes a "double-sided" column, an "aggregate (2 in 1)" column, a "color" column, and a "character" column. The "double-sided" column indicates whether to perform double-sided printing. The "aggregate (2 in 1)" column indicates whether to aggregate images of two pages on one page. The "color" column indicates whether to perform color printing. The "character" column indicates a character size when being printed. The "character" column indicates any of "large" representing a larger character size than a standard, "standard" representing the character size of the standard, and "small" representing a smaller character size than the standard.

The control portion 35 shown in FIG. 3 includes, for example, a CPU, a ROM having stored thereon a program and various data, and a RAM used as a working area for the CPU. The CPU executes the program stored on the ROM or the storage portion 34.

The control portion 35 functions as a reservation acceptance portion 35a, a user registration portion 35b, a user detection portion 35c, a printing control portion 35d, and a mail transmission portion 35e by executing the printing control program 34a stored on the storage portion 34. The reservation acceptance portion 35a electrically accepts a reservation for use of the venue for a meeting. The user registration portion 35b registers a user, namely, an expected participant of the meeting. The user detection portion 35c detects that the user registered by the user registration portion 35b has entered a printing start area as a specific area. When entry of the user into the printing start area is detected by the user detection portion 35c, the printing control portion 35d causes the MFP 20 to print the distribution material 34c. The mail transmission portion 35e transmits the distribution material 34c via e-mail.

The configuration of each of the plurality of portable devices of the image forming system 10 shown in FIG. 1 is the same as the configuration of the portable device 40. Therefore, the portable device 40 will be described below as a representative of the plurality of portable devices in the image forming system 10.

Figure 5:
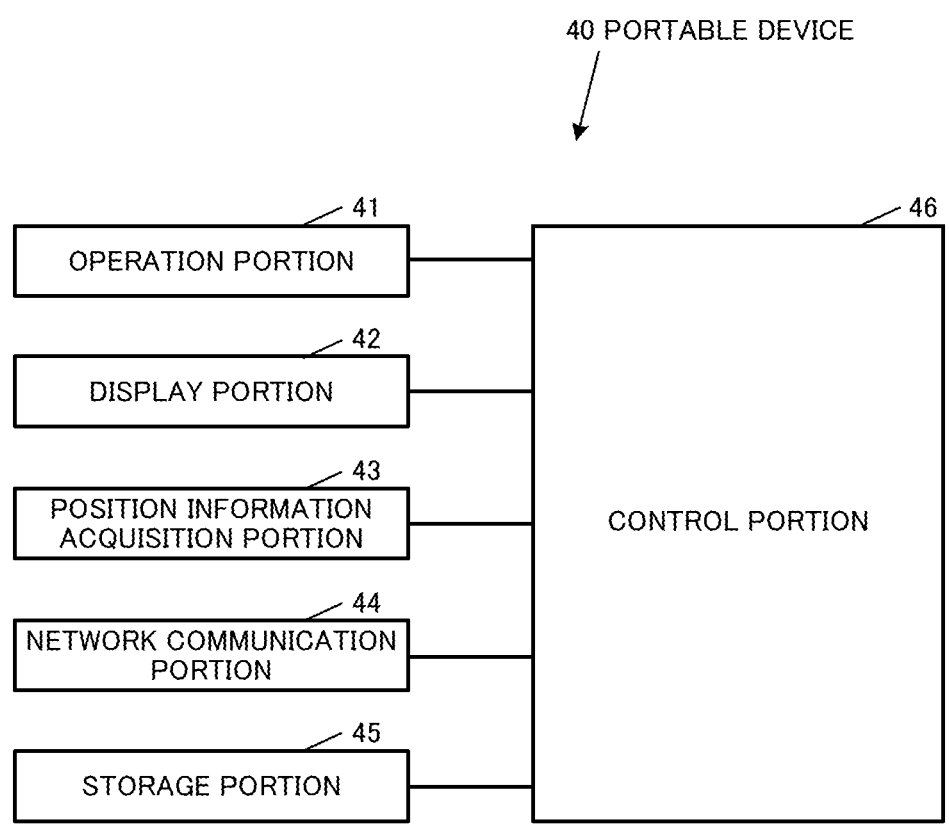
FIG. 5 shows the configuration of a portable device in FIG. 1.

FIG. 5 shows the configuration of the portable device 40.

As shown in FIG. 5, the portable device 40 includes an operation portion 41, a display portion 42, a position information acquisition portion 43, a network communication portion 44, a storage portion 45, and a control portion 46. The operation portion 41 is an input device such as a button or the like to which various operations are inputted. The display portion 42 is a device such as an LCD or the like that displays various information. The position information acquisition portion 43 is a device such as a PGS (Global Positioning System) receiver that acquires position information of the portable device 40. The communication portion 44 is a device that performs communication with an external apparatus via the network 11 (see FIG. 1). The storage portion 45 is a non-volatile memory such as an HDD or the like that has stored thereon a program and various data. The control portion 46 is a processor that controls the entirety of the portable device 40. The portable device 40 is composed of an electronic device such as a smartphone, a tablet, or the like.

The control portion 46 includes, for example, a CPU, a ROM having stored thereon a program and various data, and a RAM used as a working area for the CPU. The CPU executes the program stored on the ROM or the storage portion 45.

Next, an operation of the image forming system 10 will be described.

First, an operation of the image forming system 10 when a meeting operator reserves the venue will be described.

Figure 6:
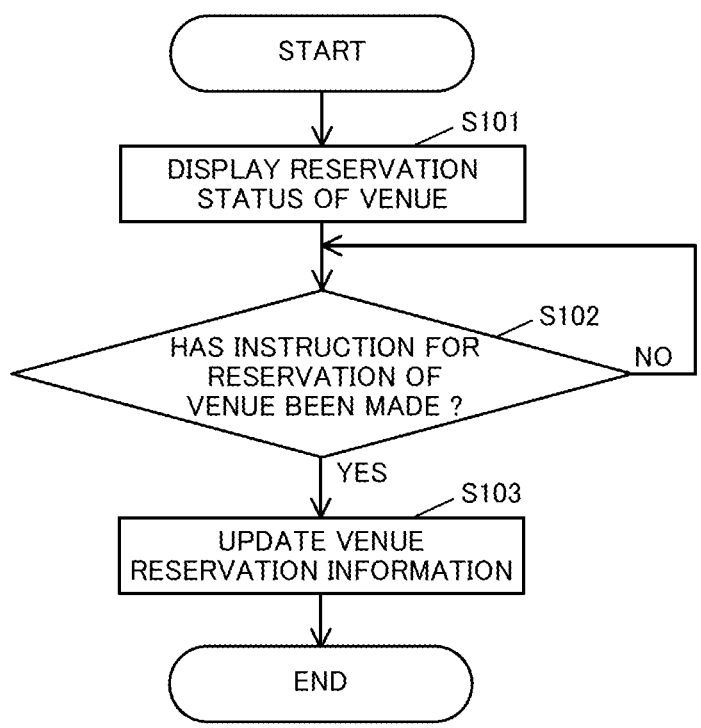
FIG. 6 shows an operation of the management server in FIG. 3 when a reservation of a venue is accepted.

When the operator makes an instruction of starting a venue reservation process via the operation portion 31 of the management server 30, the reservation acceptance portion 35*a* of the control portion 35 of the management server 30 executes an operation shown in FIG. 6.

FIG. 6 shows an operation of the management server 30 when a reservation of the venue is accepted.

As shown in FIG. 6, the reservation acceptance portion 35*a* displays, on the display portion 32, the reservation status of the venue based on the venue reservation information 34*b* on the storage portion 34 (S101). Therefore, the operator is allowed to recognize vacant time of the venue by confirming the reservation status of the venue displayed on the display portion 32.

Next, the reservation acceptance portion 35*a* determines whether an instruction for a reservation of the venue at any time among the vacant time of the venue has been made, until the reservation acceptance portion 35*a* determines that an instruction for a reservation of the venue at any time among the vacant time of the venue has been made via the operation portion 31 (S102).

When the reservation acceptance portion 35*a* determines in S102 that an instruction for a reservation of the venue at any time among the vacant time of the venue has been made, the reservation acceptance portion 35*a* updates the venue reservation information 34*b* on the storage portion 34 on the basis of the instructed reservation (S103) and ends the operation shown in FIG. 6.

Next, an operation of the image forming system 10 when the operator causes the distribution material 34*c* to be stored on the storage portion 34 will be described.

Figure 7:
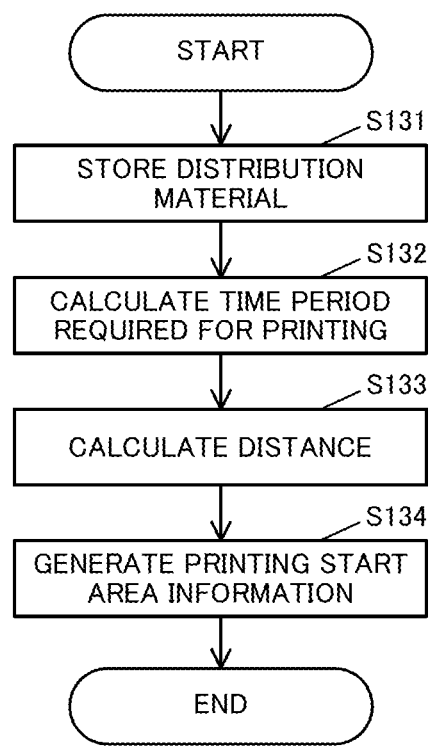
FIG. 7 shows an operation of the management server in FIG. 3 when a distribution material is caused to be stored on a storage portion.

When the operator makes an instruction for storing the distribution material 34*c* via the operation portion 31 of the management server 30, the control portion 35 of the management server 30 executes an operation shown in FIG. 7.

FIG. 7 shows an operation of the management server 30 when the distribution material 34*c* is caused to be stored on the storage portion 34.

As shown in FIG. 7, the control portion 35 of the management server 30 causes a distribution material inputted by the operator, for example, via a USB memory (Universal Serial Bus), to be stored as the distribution material 34*c* on the storage portion 34 (S131).

Next, the control portion 35 calculates a time period required for printing the distribution material 34*c* by the MFP 20, on the basis of the contents of the distribution material 34*c* (S132). For example, the control portion 35 may calculate a time period required for printing the distribution material 34*c* by the MFP 20, on the basis of the number of pages of the distribution material 34*c* and the number of objects such as figures and the like included in the distribution material 34*c*. In addition, the control portion 35 may calculate a time period required for printing the distribution material 34*c* by the MFP 20, also on the basis of the printing ability of the MFP 20.

Next, the control portion 35 calculates a distance by which a participant is expected to move within the required time period calculated in S132, namely, a product of the required time period calculated in S132 and a speed that is previously set as a moving speed of the participant (S133).

Next, the control portion 35 generates the printing start area information 34*d* with, as a printing start area, an area surrounded by positions away from the venue by the distance calculated in S133 (S134), and ends the operation shown in FIG. 7.

Next, an operation of the image forming system 10 when a person wishing to participate in the meeting applies for participation in the meeting will be described.

Figure 8:
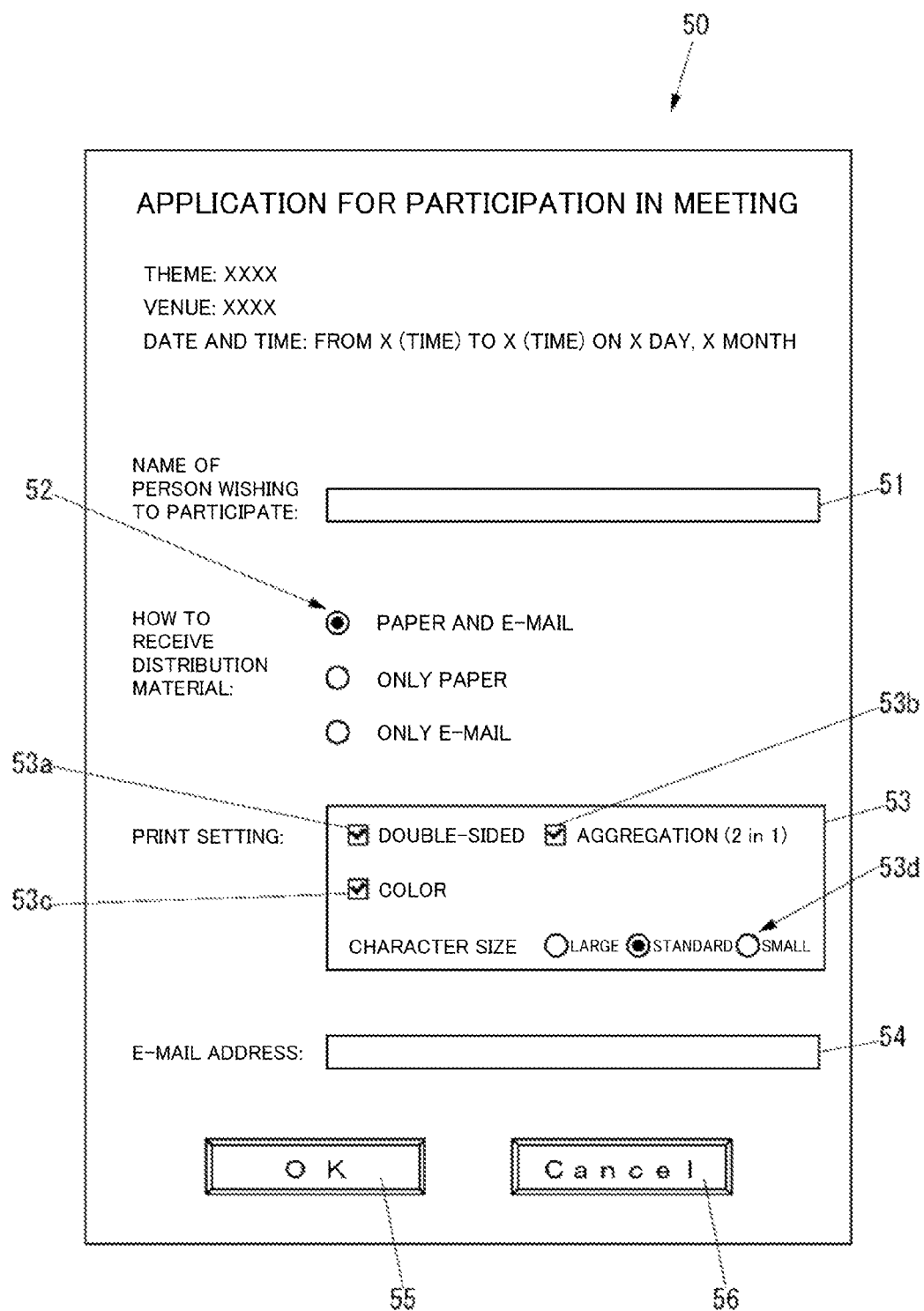
FIG. 8 shows an example of a participation application screen displayed on a display portion of the portable device in FIG. 5.

When the person wishing to participate accesses a web site for applying for participation in the meeting (hereinafter, referred to as "participation application site") via the portable device 40, a participation application screen 50 shown in FIG. 8 is displayed on the display portion 42 of the portable device 40. It should be noted that the participation application site is provided by the user registration portion 35*b* of the control portion 35 of the management server 30.

FIG. 8 is a diagram showing an example of the participation application screen 50 displayed on the display portion 42 of the portable device 40.

The participation application screen 50 shown in FIG. 8 includes a text box 51, radio buttons 52, a print setting input area 53, a text box 54, an OK button 55, and a Cancel button 56. The text box 51 is used in order for the person wishing to participate to input the name of the person wishing to participate in the meeting. The radio buttons 52 are used for selecting how to receive the distribution material 34*c*. The print setting input area 53 is used for inputting a print setting for the distribution material 34*c* when the distribution material 34*c* is received as paper. The text box 54 is used for inputting an e-mail address at which the distribution material 34*c* is received via e-mail. The OK button 55 is capable of being operated for applying for participation in the meeting. The Cancel button 56 is capable of being operated for cancelling application for participation in the meeting.

The radio buttons 52 are capable of being selected as only any one of "paper and e-mail", "only paper", and "only e-mail". Selection of "paper and e-mail" indicates that the distribution material 34*c* is received both as paper and via e-mail. Selection of "only paper" indicates that the distribution material 34*c* is received only as paper. Selection of "only e-mail" indicates that the distribution material 34*c* is received only via e-mail.

The print setting input area 53 is grayed out when the radio buttons 52 indicate "only e-mail". The print setting input area 53 includes check boxes 53*a*, 53*b*, and 53*c* and radio buttons 53*d*. The check box 53*a* is used for setting whether to perform double-sided printing. The check box 53*b* is used for setting whether to aggregate images of two pages on one page. The check box 53*c* is used for setting whether to perform color printing. The radio buttons 53*d* are used for setting a character size when being printed. The radio buttons 53*d* are capable of being selected as only any one of "large" indicating a larger character size than a standard, "standard" indicating the character size of the standard, and "small" indicating a smaller character size than the standard.

The text box 54 is grayed out when the radio buttons 52 indicate "only paper".

The OK button 55 is grayed out when nothing is inputted in the text box 51. In addition, the OK button 55 is grayed out when the radio buttons 52 indicate "paper and e-mail" or "only e-mail" and nothing is inputted in the text box 54.

When the OK button 55 is pressed via the operation portion 41 of the portable device 40, information representing the contents that have been inputted on the participation application screen 50 at that time (hereinafter, referred to as "application information") is transmitted to the management server 30.

Therefore, upon reception of the application information via the network communication portion 33, the user registration portion 35b of the management server 30 updates the expected participant list 34e on the storage portion 34 on the basis of the received application information. In other words, the user registration portion 35b registers the information on the person wishing to participate which information is included in the application information received via the network communication portion 33, as information on a new expected participant in the expected participant list 34e.

It should be noted that the case where the person wishing to participate accesses the participation application site via the portable device 40 has been described above, but the person wishing to participate may access the participation application site via a computer other than the portable device 40.

In addition, the person wishing to participate may apply for participation in the meeting by informing the operator of application information by a method such as e-mail, telephone, or the like, not through the participation application site. On the basis of the application information informed of by the person wishing to participate, the operator makes an instruction for registering information on the new expected participant via the operation portion 31 of the management server 30. Therefore, in accordance with the instruction via the operation portion 31, the user registration portion 35b of the management server 30 registers, in the expected participant list 34e, the information on the new expected participant that is the person wishing to participate who has applied for participation in the meeting.

Next, an operation of the image forming system 10 when an expected participant gets close to the venue will be described.

Figure 9:
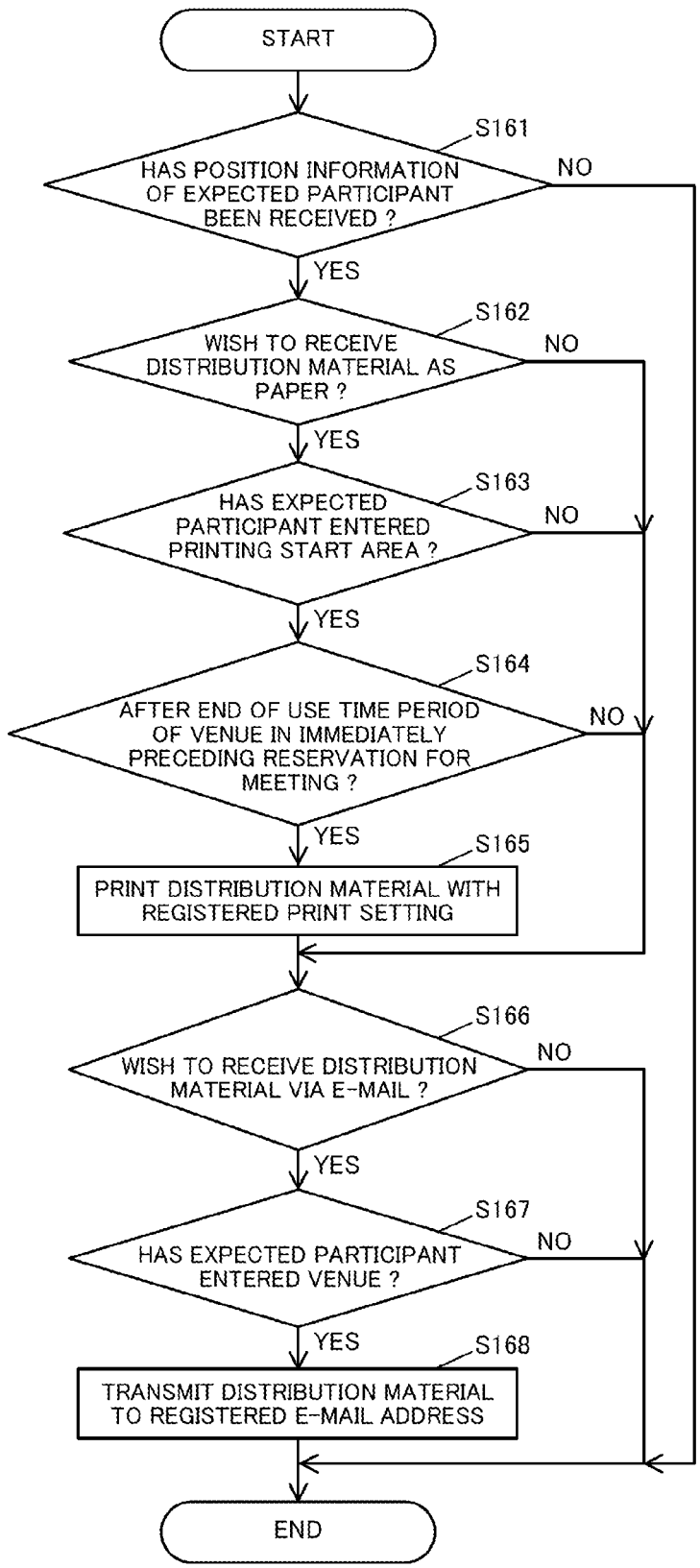
FIG. 9 shows an operation of the management server in FIG. 3 when the distribution material is distributed to an expected participant.

The control portion 35 of the management server 30 periodically executes an operation shown in FIG. 9.

FIG. 9 shows an operation of the management server 30 when the distribution material 34c is distributed to an expected participant.

As shown in FIG. 9, the user detection portion 35c of the control portion 35 of the management server 30 determines whether position information of any expected participant registered in the expected participant list 34e has been received via the network communication portion 33 (S161). Here, a portable device carried by each expected participant periodically executes an operation of acquiring position information of the portable device itself and transmitting the position information together with identification information of the expected participant to the MFP 20 via the network 11. Then, the MFP 20 transmits a combination of the position information and the identification information of the expected participant received from the portable device, to the management server 30 via the network 11. Therefore, if the identification information received together with the position information via the network communication portion 33 is stored in the expected participant list 34e, the user detection portion 35c of the management server 30 is able to determine that the position information of the expected participant registered in the expected participant list 34e has been received. It should be noted that the identification information may be the name of the expected participant or may be identification information other than the name of the expected participant.

When the user detection portion 35c determines in S161 that the position information of the expected participant has been received, the user detection portion 35c determines whether the expected participant (hereinafter, referred to as "target expected participant") wishes to receive the distribution material 34c as paper (S162). Here, if the content in the "paper" column associated with the target expected participant in the expected participant list 34e indicates that the distribution material 34c is received as paper, the user detection portion 35c determines that the target expected participant wishes to receive the distribution material 34c as paper.

When the user detection portion 35c determines in S162 that the target expected participant wishes to receive the distribution material 34c as paper, the user detection portion 35c determines whether the target expected participant has entered the printing start area indicated by the printing start area information 34d, on the basis of the position information of the target expected participant (S163).

When it is determined in S163 that the target expected participant has entered the printing start area indicated by the printing start area information 34d, the printing control portion 35d determines whether the current time is after a use time period of the venue in a reservation immediately prior to a reservation relating to the target expected participant, namely, after end of a use time period of the venue in a reservation for a meeting immediately prior to a reservation for the meeting in which the target expected participant is going to participate, on the basis of the venue reservation information 34b (S164).

When the printing control portion 35d determines in S164 that the current time is after the end of the use time period of the venue in the immediately preceding reservation for the meeting, the printing control portion 35d causes the MFP 20 to print the distribution material 34c with the print setting indicated in the "print setting" column associated with the target expected participant in the expected participant list 34e (S165). In other words, the printing control portion 35d transmits print data of the distribution material 34c reflecting the print setting indicated in the "print setting" column associated with the target expected participant in the expected participant list 34e, to the MFP 20 via the network communication portion 33. Then, upon reception of the print data via the network communication portion 26, the control portion 28 of the MFP 20 causes the printer 24 to execute printing on the basis of the print data.

When the user detection portion 35c determines in S162 that the target expected participant does not wish to receive the distribution material 34c as paper, when the user detection portion 35c determines in S163 that the target expected participant has not entered the printing start area indicated by the printing start area information 34d, when it is determined in S164 that the current time is not after the end of the use time period of the venue in the immediately preceding reservation for the meeting, or when the process in S165 ends, the user detection portion 35c determines whether the target expected participant wishes to receive the distribution material 34c via e-mail (S166). Here, if the content in the "e-mail" column associated with the target expected participant in the expected participant list 34e indicates that the distribution material 34c is received via e-mail, the user detection portion 35c determines that the target expected participant wishes to receive the distribution material 34c via e-mail.

When it is determined in S166 that the target expected participant wishes to receive the distribution material 34c via e-mail, the mail transmission portion 35e determines whether the target expected participant has entered the venue, on the basis of the position information of the target expected participant (S167).

When it is determined in S167 that the target expected participant has entered the venue, the mail transmission portion 35e transmits the distribution material 34c via e-mail to the e-mail address in the "e-mail address" column associated with the target expected participant in the expected participant list 34e (S168). It should be noted that the expected participant is allowed to confirm the distribution material 34c during the meeting by displaying the distribution material received via e-mail on the display portion of the portable device.

When the user detection portion 35c determines in S161 that the position information of the expected participant has not been received, when the user detection portion 35c determines in S166 that the target expected participant does not wish to receive the distribution material 34c via e-mail, when it is determined in S167 that the target expected participant has not entered the venue, or when the process in S168 ends, the user detection portion 35c ends the operation shown in FIG. 9.

It should be noted that in the operation shown in FIG. 9, the control portion 35 does not execute again printing of the distribution material 34c for the expected participant for whom printing of the distribution material 34c has been executed once. Similarly, in the operation shown in FIG. 9, the control portion 35 does not transmit again the distribution material 34c via e-mail to the expected participant to whom the distribution material 34c has been transmitted via e-mail once.

As described above, in the image forming system 10, when entry of an expected participant of the meeting into the printing start area is detected (YES in S163), it is possible to print the distribution material 34c with the print setting registered so as to be associated with the expected participant (S165). Therefore, in the image forming system 10, when the distribution material 34c is printed in the case where the expected participant has entered the printing start area, for example, it is possible to provide a printed object suitable for the expected participant in terms of a printing size, color, or the like.

In the image forming system 10, when entry of an expected participant of the meeting into the printing start area is detected (YES in S163), it is possible to print the distribution material 34c (S165). Therefore, in the image forming system 10, when an expected participant does not actually participate in the meeting, it is possible to prevent printing of the distribution material 34c for the expected participant. Thus, in the image forming system 10, it is not necessary to previously print and prepare the distribution material 34c for all the expected participants who wish to receive the distribution material 34c as paper, and thus it is possible to suppress wasteful consumption of paper.

In addition, in the image forming system 10, when an expected participant does not need the distribution material 34c as paper (No in S162), the distribution material 34c is not distributed as paper thereto, and thus it is possible to suppress wasteful consumption of paper as compared to the configuration in which the distribution material 34c is distributed as paper to all the expected participants.

In the image forming system 10, when entry of an expected participant of the meeting into the printing start area is detected (YES in S163), it is possible to print the distribution material 34c (S165). Thus, in the image forming system 10, it is possible to print the distribution material 34c in substantially the same order as the order in which the expected participants arrive at the venue. Therefore, when distributing a printed object of the distribution material 34c to an expected participant that has arrived at the venue, the meeting operator is allowed to easily find the printed object for the expected participant from among a large number of printed objects created by the MFP 20.

In particular, in the image forming system 10, when entry of an expected participant into the printing start area is detected (YES in S163), it is possible to cause the MFP 20 to print, together with the distribution material 34c, the identification information of the expected participant, for example, the name of the expected participant (S165). Thus, since the identification information of the expected participant is printed on the printed object, the meeting operator is allowed to easily distribute the printed object suitable for the expected participant to the appropriate expected participant.

In the image forming system 10, after end of a use time period of the venue in a reservation for a meeting immediately prior to a reservation for a meeting in which an expected participant is going to participate (hereinafter, referred to as "target meeting") (YES in S164), it is possible to cause the MFP 20 to print the distribution material 34c (S165). Thus, in the image forming system 10, in the case where a printed object of the distribution material 34c is required in use of the venue corresponding to the reservation for the target meeting, it is possible to prevent the printed object from being created before the end of the use time period of the venue corresponding to the reservation for the meeting immediately prior to the reservation for the target meeting. Therefore, in the image forming system 10, it is possible to reduce the possibility that a printed object is distributed to an inappropriate expected participant by mistake. As a result, the meeting operator is allowed to distribute a printed object to an appropriate expected participant.

It should be noted that in the image forming system 10, when entry of an expected participant into the printing start area is detected, the distribution material 34c may be printed without any consideration of the use time period of the venue in the reservation for the meeting immediately prior to the reservation for the target meeting.

In the image forming system 10, entry of an expected participant into an area different from the printing start area, namely, into the venue, is detected (YES in S167), it is possible to transmit the distribution material 34c to the expected participant via e-mail (S168). Thus, in the image forming system 10, the distribution material 34c is transmitted via e-mail at a timing different from a timing at which a printed object suitable for the expected participant is created, and hence it is possible to transmit the distribution material 34c via e-mail at an effective timing suitable for e-mail, not at a timing suitable for creation of the printed object.

It should be noted that in the image forming system 10, the distribution material 34c may be transmitted via e-mail at a timing other than a timing at which an expected participant enters the venue. For example, in the image forming system 10, at a timing at which an expected participant is registered in the expected participant list 34e, the distribution material 34c may be transmitted to the expected participant via e-mail. In addition, in the image forming system 10, the distribution material 34c may be transmitted via e-mail at the same timing as a timing at which the MFP 20 is caused to print the distribution material 34c.

In the image forming system 10, a print setting other than the print setting illustrated in the present embodiment may be designated as a print setting applicable to the distribution material 34c.

In the image forming system 10, the distribution material 34c is transmitted via e-mail, but the distribution material 34c may be transmitted as electrical data other than an e-mail.

In the above, the description regarding the meeting has been given, but the image forming system 10 is applicable to an affair other than a meeting, such as an event, a seminar, and the like, as long as documents are distributed to participants for the affair.

In the image forming system 10, the management server 30 acquires the position information from the portable device via the MFP 20, but the management server 30 may acquire the position information directly from the portable device.

In the image forming system 10, the position information of each expected participant is detected by GPS, but the position information of each expected participant may be detected by any method other than GPS.

In the image forming system 10, the MFP 20 may execute at least some of the functions of the management server 30. For example, in the image forming system 10, the MFP 20 may execute all the functions of the management server 30, and the management server 30 itself may not be provided.

In addition, in the present embodiment, the image forming system 10 includes the MFP as the image forming apparatus according to the present disclosure, but may include an image forming apparatus other than the MFP, such as an apparatus dedicated to printing, as the image forming apparatus according to the present disclosure.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image forming system comprising:
   a user registration portion configured to register a user so as to associate the user with a print setting;
   a control portion configured to calculate a printing time period required for printing a document by an image forming apparatus, calculate a distance by which the user is expected to move within the required time period based on the required time period and a moving speed of the user, and calculate an area surrounded by positions away from a venue based on the calculated distance;
   a user detection portion configured to detect that the user registered by the user registration portion has entered the area surrounded by positions away from the venue; and
   a printing control portion configured to cause an image forming apparatus to start printing a specific document at a printing start time point with the print setting registered by the user registration portion so as to be associated with the user, at least when entry of the user into the area is detected by the user detection portion;
   wherein the printing time period comprises the printing start time point when printing starts and a printing end time point when printing ends, and
   wherein the printing start time point is set such that the printing end time point substantially coincides with an arrival time point when the user is calculated to arrive at the venue.

2. The image forming system according to claim 1, wherein when entry of the user into the area is detected by the user detection portion, the printing control portion causes the image forming apparatus to print identification information of the user together with the document.

3. The image forming system according to claim 1, wherein the area encompasses the venue, the system further comprising a reservation acceptance portion configured to electrically accept a reservation for use of the venue located within the area, wherein
   when entry of the user into the area is detected by the user detection portion and after end of a use time period of the venue accepted by the reservation acceptance portion through a reservation immediately prior to a reservation relating to the user, the printing control portion causes the image forming apparatus to print the document.

4. The image forming system according to claim 1, further comprising a mail transmission portion configured to transmit the document via e-mail, wherein
   the user registration portion registers an e-mail address so as to associate the e-mail address with the user, and
   when entry of the user into the venue is detected by the user detection portion, the mail transmission portion transmits the document via e-mail to the e-mail address registered by the user registration portion so as to be associated with the user.

5. An image forming apparatus comprising:
   a printing device;
   a control portion configured to calculate a printing time period required for printing a document by the image forming apparatus, calculate a distance by which a user is expected to move within the required time period based on the required time period and a moving speed of the user, and calculate an area surrounded by positions away from a venue based on the calculated distance;
   a user registration portion configured to register the user so as to associate the user with a print setting;
   a user detection portion configured to detect that the user registered by the user registration portion has entered the area surrounded by positions away from the venue; and
   a printing control portion configured to cause the printing device to start printing a specific document at a printing start time point with the print setting registered by the user registration portion so as to be associated with the user, at least when entry of the user into the area is detected by the user detection portion;
   wherein the printing time period comprises the printing start time point when printing starts and a printing end time point when printing ends, and
   wherein the printing start time point is set such that the printing end time point substantially coincides with an arrival time point when the user is calculated to arrive at the venue.

6. A non-transitory computer-readable storage medium having stored thereon a printing control program causing a computer to function as:
   a user registration portion configured to register a user so as to associate the user with a print setting;
   a control portion configured to calculate a printing time period required for printing a document by an image forming apparatus, calculate a distance by which the user is expected to move within the required time period based on the required time period and a moving speed of the user, and calculate an area surrounded by positions away from a venue based on the calculated distance;
   a user detection portion configured to detect that the user registered by the user registration portion has entered the area surrounded by positions away from the venue; and
   a printing control portion configured to cause the image forming apparatus to start printing a specific document at a printing start time point with the print setting registered by the user registration portion so as to be associated with the user, at least when entry of the user into the area is detected by the user detection portion;
   wherein the printing time period comprises the printing start time point when printing starts and a printing end time point when printing ends, and
   wherein the printing start time point is set such that the printing end time point substantially coincides with an arrival time point when the user is calculated to arrive at the venue.

7. The image forming apparatus according to claim 5, wherein the area encompasses the venue, the system further comprising a reservation acceptance portion configured to electrically accept a reservation for use of the venue located within the area, wherein when entry of the user into the area is detected by the user detection portion and after end of a use time period of the venue accepted by the reservation acceptance portion through a reservation immediately prior to a reservation relating to the user, the printing control portion causes the printing device to print the document.

8. The non-transitory computer-readable storage medium having stored thereon the printing control program of claim 6, causing the computer to further function as:

a reservation acceptance portion configured to electrically accept a reservation for use of the venue located within the area, wherein the area encompasses the venue, and wherein when entry of the user into the area is detected by the user detection portion and after end of a use time period of the venue accepted by the reservation acceptance portion through a reservation immediately prior to a reservation relating to the user, the printing control portion causes the image forming apparatus to print the document.

9. The image forming apparatus according to claim 5, further comprising a mail transmission portion configured to transmit the document via e-mail, wherein the user registration portion registers an e-mail address so as to associate the e-mail address with the user, and when entry of the user into the venue is detected by the user detection portion, the mail transmission portion transmits the document via e-mail to the e-mail address registered by the user registration portion so as to be associated with the user.

10. The non-transitory computer-readable storage medium having stored thereon the printing control program of claim 6, causing the computer to further function as:

a mail transmission portion configured to transmit the document via e-mail, wherein the user registration portion registers an e-mail address so as to associate the e-mail address with the user, and when entry of the user into the venue is detected by the user detection portion, the mail transmission portion transmits the document via e-mail to the e-mail address registered by the user registration portion so as to be associated with the user.

11. The image forming system according to claim 1, wherein the control portion is configured to calculate the area surrounded by positions away from the venue by the calculated distance.

12. The image forming system according to claim 1, further comprising a mail transmission portion configured to transmit the document via e-mail, wherein the user registration portion is configured to register the user so as to associate the user with a print setting and a selection of how to receive the specific document, the selection includes a first selection where the specific document is received both as paper and via e-mail, a second selection where the specific document is received only as paper, and a third selection where the specific document is received only via e-mail, the user registration portion registers an e-mail address so as to associate the e-mail address with the user, and in a situation where the first selection is associated with the user, when entry of the user into the area is detected by the user detection portion, the printing control portion causes the image forming apparatus to start printing the specific document with the print setting registered by the user registration portion so as to be associated with the user, and the mail transmission portion transmits the document via e-mail to the e-mail address registered by the user registration portion so as to be associated with the user, in a situation where the second selection is associated with the user, when entry of the user into the area is detected by the user detection portion, the printing control portion causes the image forming apparatus to start printing the specific document with the print setting registered by the user registration portion so as to be associated with the user, and the mail transmission portion avoids transmitting the document via e-mail, and in a situation where the third selection is associated with the user, when entry of the user into the venue is detected by the user detection portion, the mail transmission portion transmits the document via e-mail to the e-mail address registered by the user registration portion so as to be associated with the user, and the printing control portion avoids causing the image forming apparatus to print the specific document.

* * * * *